US010179986B1

(12) United States Patent
Morrison, Sr.

(10) Patent No.: US 10,179,986 B1
(45) Date of Patent: Jan. 15, 2019

(54) PLOW CONVERSION KIT

(71) Applicant: Richard A Morrison, Sr., Wilmington, DE (US)

(72) Inventor: Richard A Morrison, Sr., Wilmington, DE (US)

( * ) Notice: Subject to any disclaimer, the term of this patent is extended or adjusted under 35 U.S.C. 154(b) by 0 days.

(21) Appl. No.: 15/800,246

(22) Filed: Nov. 1, 2017

(51) Int. Cl.
*E02F 3/627* (2006.01)
*E02F 3/36* (2006.01)
*E02F 9/22* (2006.01)
*E02F 3/413* (2006.01)
*A01B 59/06* (2006.01)

(52) U.S. Cl.
CPC .......... *E02F 3/3663* (2013.01); *E02F 3/4133* (2013.01); *E02F 9/2203* (2013.01); *A01B 59/064* (2013.01)

(58) Field of Classification Search
CPC ..... E02F 3/3663; E02F 3/4133; E02F 9/2203; A01B 59/064
See application file for complete search history.

(56) References Cited

U.S. PATENT DOCUMENTS

| | | | |
|---|---|---|---|
| 3,243,067 A * | 3/1966 | Artman | E02F 3/401 37/406 |
| 4,020,963 A | 5/1977 | Carter | |
| 4,199,293 A * | 4/1980 | Peterson | E02F 9/2203 414/699 |
| 4,554,978 A | 11/1985 | Schneider | |
| 5,727,342 A * | 3/1998 | Horton | E02F 3/3622 37/468 |
| 6,360,459 B1 | 3/2002 | Brookhart et al. | |
| 6,526,677 B1 | 3/2003 | Bloxdorf et al. | |
| 6,691,435 B1 | 2/2004 | Schultz et al. | |
| 8,240,970 B2 * | 8/2012 | Bricker | E02F 3/3411 172/274 |
| 8,479,838 B1 | 7/2013 | Biggs et al. | |
| 8,684,623 B2 * | 4/2014 | Robl | F16D 1/00 37/468 |
| 8,869,911 B2 | 10/2014 | Anderson | |
| 8,919,455 B2 | 12/2014 | Hendron et al. | |
| 9,039,343 B2 | 5/2015 | Nishi et al. | |
| 9,051,716 B2 | 6/2015 | Bricker et al. | |
| 9,238,900 B2 | 1/2016 | Matsumoto et al. | |

(Continued)

OTHER PUBLICATIONS

Caterpillar, Inc. "New Wheel Loaders". 7 pages. Undated.

*Primary Examiner* — Michael S Lowe
(74) *Attorney, Agent, or Firm* — Joseph E. Maenner; Petock & Petock, LLC

(57) ABSTRACT

A plow conversion kit includes a frame having a frame proximal end, a frame distal end, and a top surface extending between the proximal end and the distal end. A fixed bracket is fixed to the top surface of the frame. The fixed bracket has a fixed bracket proximal end and a fixed bracket distal end. A hydraulic cylinder has a cylinder proximal end pivotally connected to the fixed bracket and a cylinder distal end extending distally of the fixed bracket. A mounting bracket has a lower end pivotally connected to the fixed bracket distal end. A mount arm has a lower end pivotally connected to the mounting bracket. A pivot bracket has a lower end pivotally connected to the frame distal end, a central portion pivotally connected to the cylinder distal end, and a top end connectable to an upper portion of the mount arm.

19 Claims, 10 Drawing Sheets

(56) References Cited

U.S. PATENT DOCUMENTS

| | | |
|---|---|---|
| 9,267,263 B2 | 2/2016 | Bertrand et al. |
| 9,528,242 B2 | 12/2016 | Oyama et al. |
| 2007/0272421 A1* | 11/2007 | Elliott .................. A01B 59/064 172/445.1 |
| 2008/0210446 A1 | 9/2008 | Cherney et al. |
| 2012/0237292 A1 | 9/2012 | Seda et al. |
| 2013/0078070 A1 | 3/2013 | May |
| 2016/0319512 A1 | 11/2016 | O'Neill et al. |

* cited by examiner

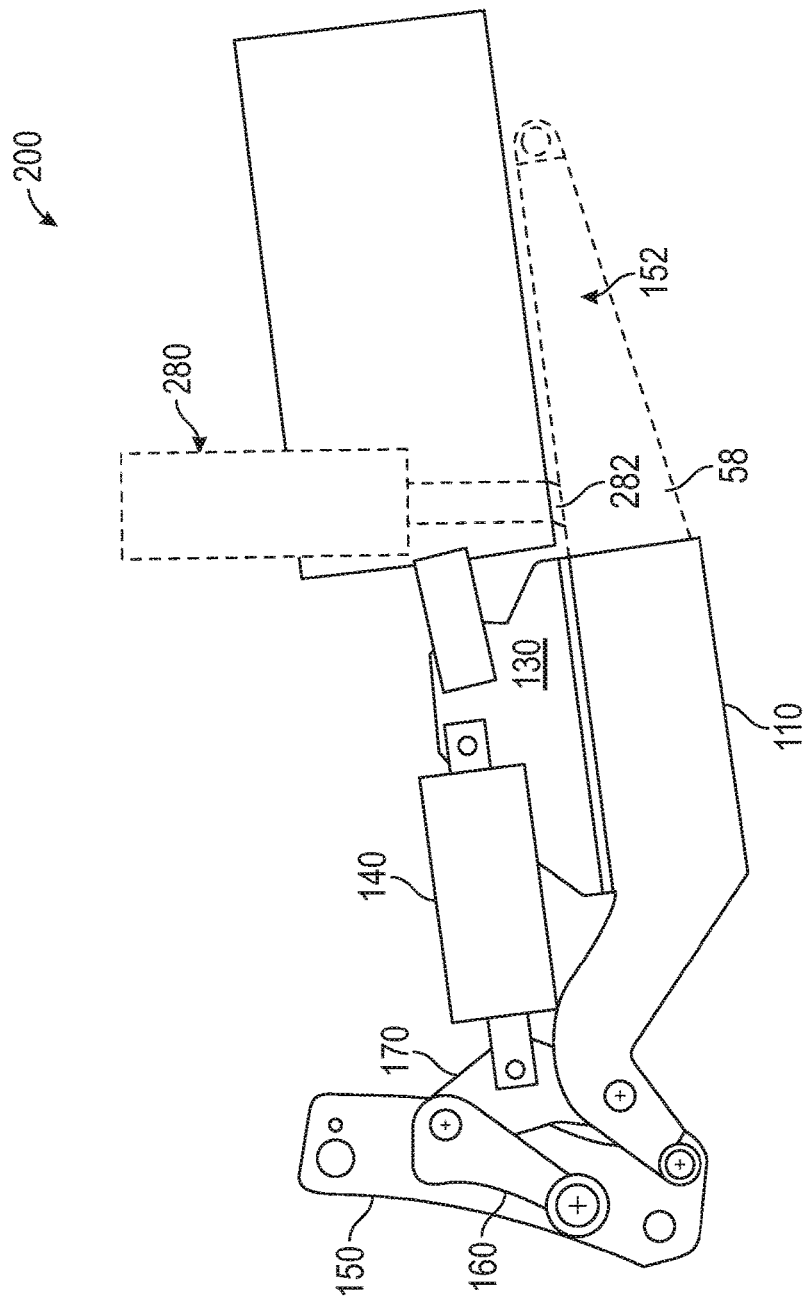

PLOW CONVERSION KIT

BACKGROUND OF THE INVENTION

Field of the Invention

The present invention relates to a plow conversion kit that can be releasably attached to the front end of a tractor to provide a greater range of motion than is provided with originally provided equipment.

Description of the Related Art

Yard tractors are often provided with interchangeable tools that are mounted on a movable frame. The tool and the frame are hydraulically activated via hydraulic cylinders mounted on the frame and operated from a driver sitting on the tractor. Numerous replacement frames, or "conversion kits" are available that provide different features.

It would be beneficial to provide a conversion kit that has a greater range of motion than any existing frames or conversion kits.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a plow conversion kit for a tractor. The kit includes a frame having a frame proximal end, a frame distal end, and a top surface extending between the proximal end and the distal end. The proximal end is configured to slidingy connect to a tractor bracket. A fixed bracket is fixed to the top surface of the frame. The fixed bracket has a fixed bracket proximal end and a fixed bracket distal end. A first hydraulic cylinder has a first cylinder proximal end pivotally connected to the fixed bracket at a first pivot and a first cylinder distal end extending distally of the fixed bracket. A mounting bracket is adapted to releasably attach to a work piece. The mounting bracket has a lower end pivotally connected to the fixed bracket distal end at a second pivot. A mount arm has a lower end pivotally connected to the mounting bracket at a third pivot above the second pivot. A pivot bracket has a lower end pivotally connected to the frame distal end at a fourth pivot, a central portion pivotally connected to the cylinder distal end at a fifth pivot, and a top end connectable to an upper portion of the mount arm at a sixth pivot.

In an alternative embodiment, a plow conversion kit comprises a frame, a first hydraulic cylinder attached to the frame, and a pivot bracket pivotally attached to the frame and to the first hydraulic cylinder. A mounting bracket is pivotally attached to the frame such that the mounting bracket adapted to releasably attach to a work piece and a mount arm is pivotally attached to the mounting bracket and to the pivot bracket.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 10 is a sided elevational view of a plow conversion kit according to a second embodiment of the present invention.

DETAILED DESCRIPTION

Figure 1:
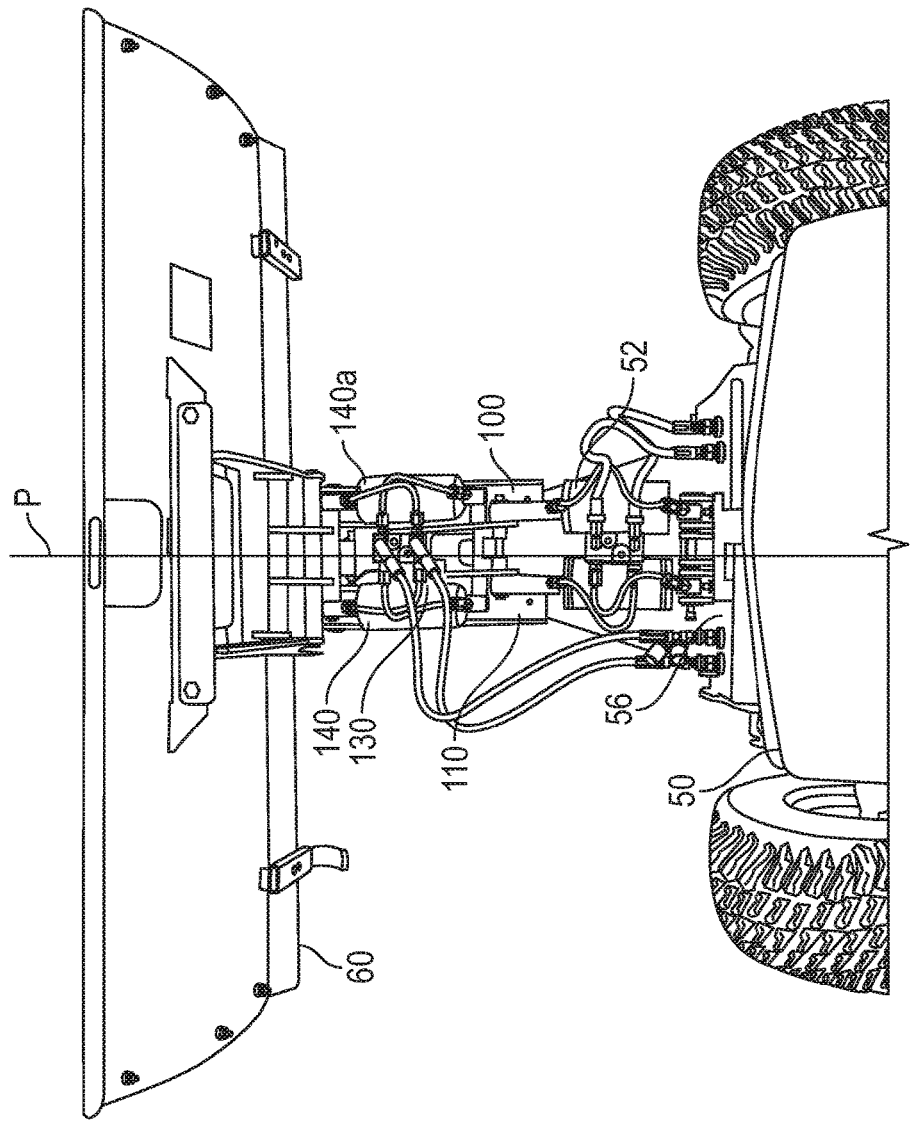
FIG. 1 is a top plan view of a plow conversion kit according to a first exemplary embodiment of the present invention mounted on a tractor, with a work piece.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "proximal" is intended to mean a direction closer to a driver of a tractor utilizing the inventive kit and "distal" is intended to mean a direction farther from the driver.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

A tractor 50, shown in FIG. 1, allows for multiple different types of work pieces 60 to be mounted on a front end thereof. Work piece 60 can be a plow, a bucket/scoop, forks, or other known work pieces that can be operated by tractor 50. While tractor 50 is shown, those skilled in the art will recognize that vehicles other than tractors, such as utility vehicles, all-terrain vehicles, or other vehicles can be used with the present invention.

Figure 2:
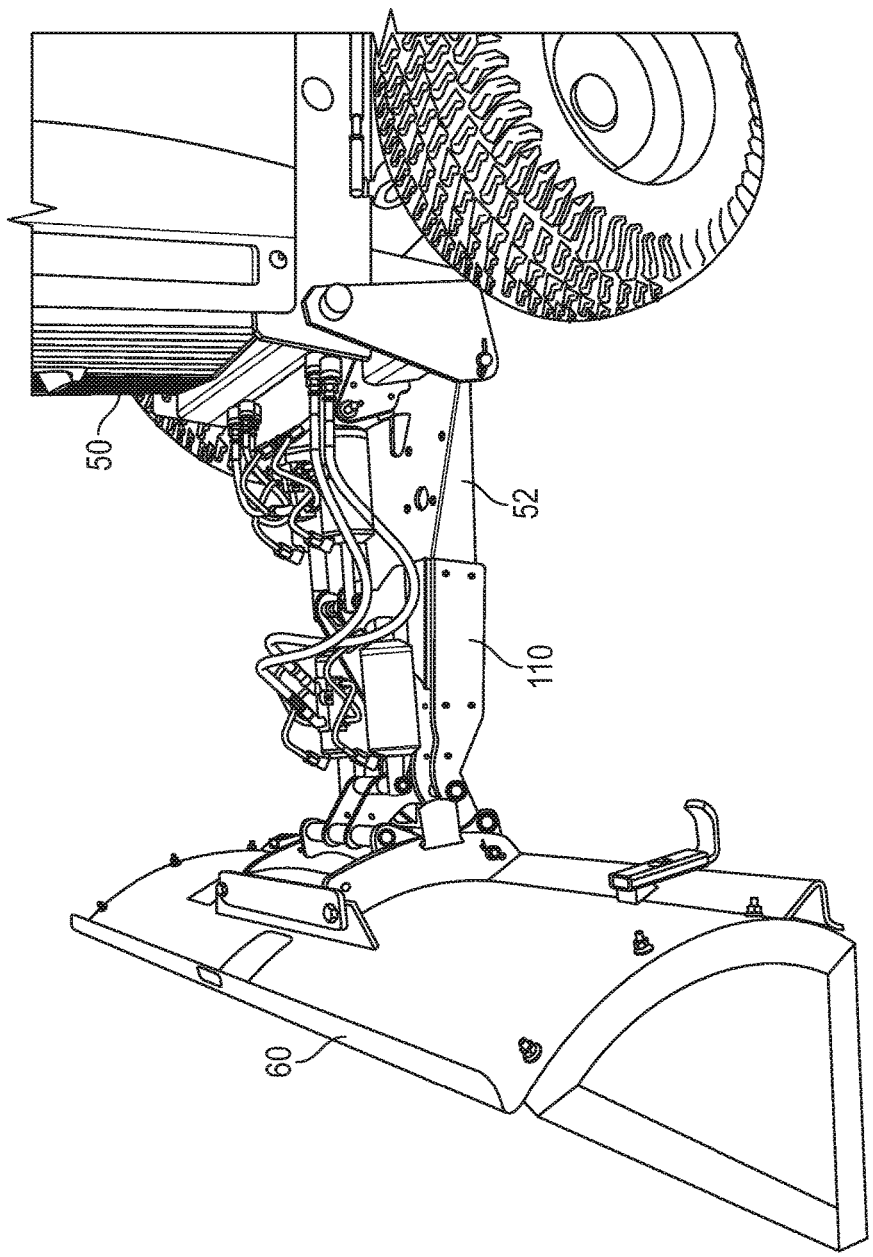
FIG. 2 is a side perspective view of the plow conversion kit mounted on the tractor, with the work piece shown in FIG. 2.

Work piece 60 is manipulated by hydraulically actuated cylinders connected to a frame between tractor 50 and workpiece 60. Hydraulic lines are shown in FIGS. 1 and 2 but are omitted from the remainder of the drawings for clarity. The present invention provides a kit that can replace the frame and the hydraulic cylinders originally provided with tractor 50 with a frame and hydraulic cylinders that provide a greater range of motion than the original equipment manufacturer ("OEM") supplied frame, allowing work piece 60 to better perform.

Referring to FIGS. 1-9, a first exemplary embodiment of a plow conversion kit 100 ("kit 100") for a tractor 50 is shown. Tractor 50 can be a John Deere® tractor or other suitable tractor having a bracket 52 onto which kit 100 can be mounted.

Kit 100 includes a frame 110 that has a frame proximal end 112, a frame distal end 114, and a top surface 116 extending between proximal end 112 and distal end 114. Proximal end 112 of frame 110 also includes a box channel 128 that is adapted to slide over bracket 52. After sliding frame 110 over bracket 52, frame 110 can be releasably secured to bracket 52 via nuts and bolts (not shown). Frame 110 is bisected by a vertical plane P that is shown in FIG. 1 as coming out of the plane of the paper of FIG. 1.

Figure 3:
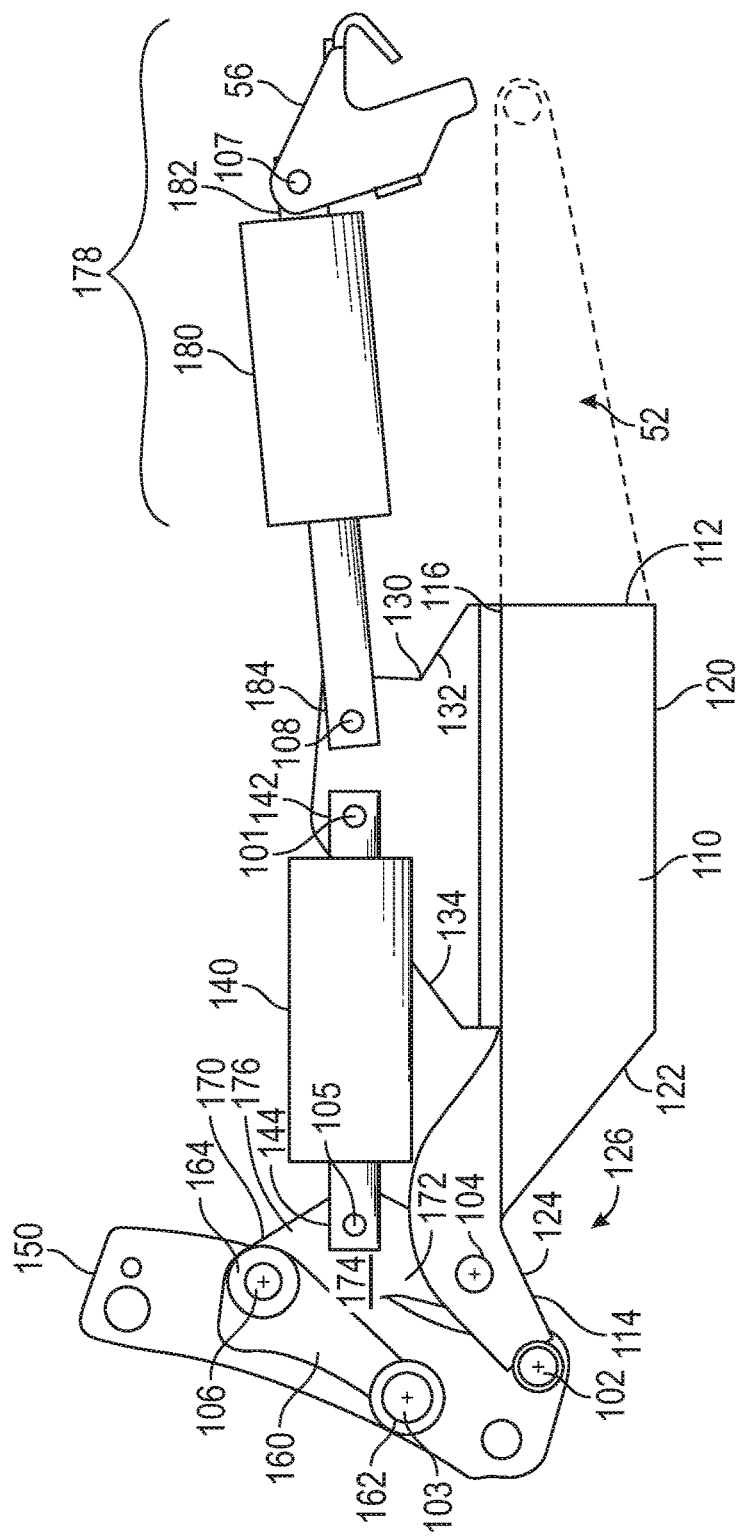
FIG. 3 is a side elevational view of the plow conversion kit shown in FIG. 2, with the work piece removed.
Figure 4:
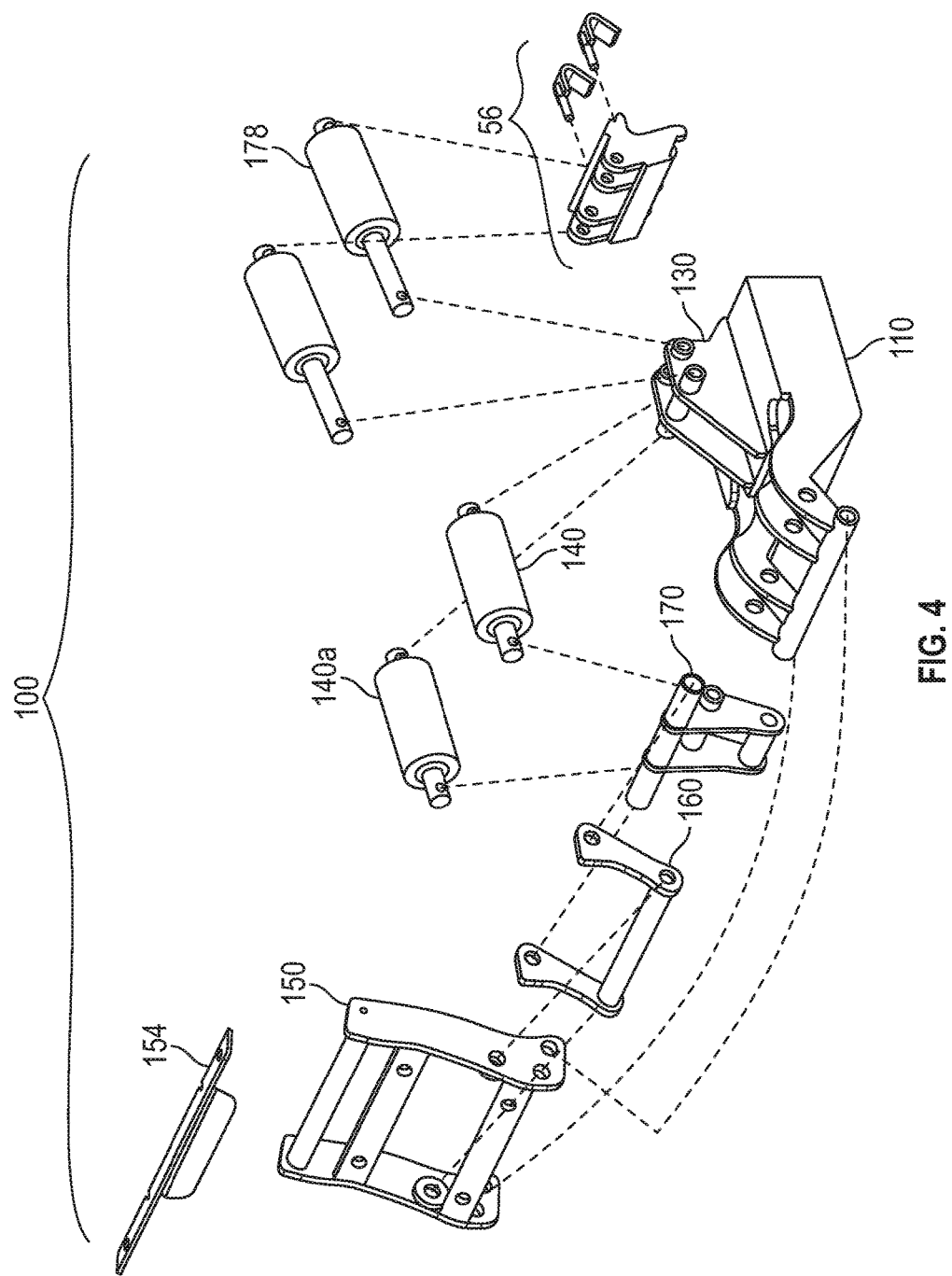
FIG. 4 is an exploded view of the plow conversion kit shown in FIG. 1.
Figure 5:
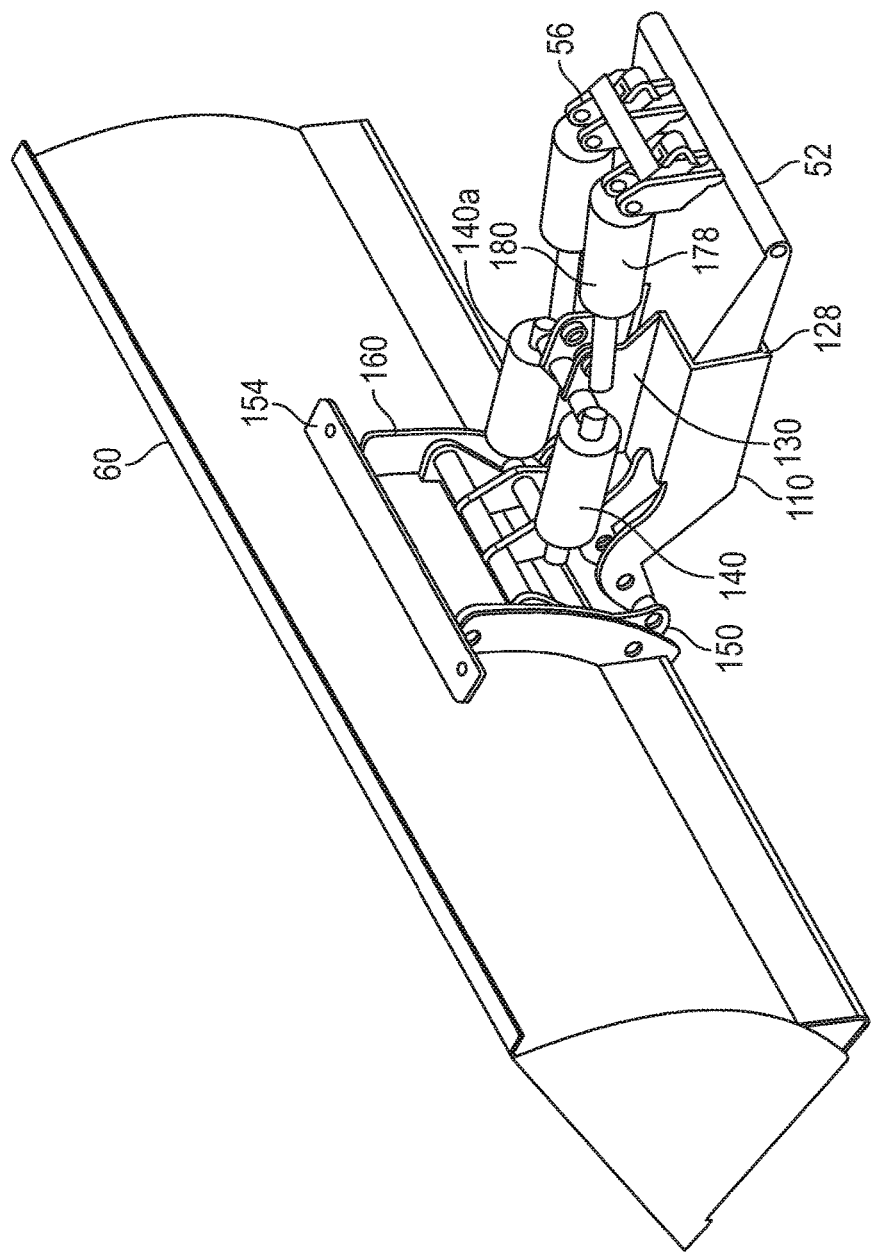
FIG. 5 is a rear perspective view of the plow conversion kit shown in FIG. 2, with the work piece attached.

Frame 110 also includes a lower surface 120 extending in a horizontal plane as shown in FIG. 3. A central surface 122 extends distally from lower surface 120 in an upwardly extending plane from lower surface 120. A distal surface 124 extends distally from central surface 122 in a downwardly extending plane from central surface 122 such that central surface 122 and distal surface 124 together define a distal concave cavity 126

A fixed bracket 130 is fixed to top surface 116 of frame 110. Fixed bracket 130 has a fixed bracket proximal end 132 and a fixed bracket distal end 134. Fixed bracket 130 can be integrally formed with frame 110 or can be a separate piece that is welded or otherwise fixedly connected to frame 110. Fixed bracket 130 extends along either side of plane P.

A first hydraulic cylinder 140 having a first cylinder proximal end 142 is pivotally connected to fixed bracket 130 at a first pivot 101 and a first cylinder distal end 144 extending distally of fixed bracket 130. While a single hydraulic cylinder 140 is shown in FIG. 3, referring to FIG. 1, hydraulic cylinder 140 can be used in parallel with a hydraulic cylinder 140a to provide additional power and control to the user. Hydraulic cylinder 140 is located on a first side of vertical plane P, while hydraulic cylinder 140a is on an opposing side of plane P. For simplicity, however, only the first side of plane P will be discussed.

Referring back to FIG. 2, a mounting bracket 150 is adapted to releasably attach to work piece 60. Mounting bracket 150 has a lower end 152 pivotally connected to distal end 114 of frame 110 at a second pivot 102. In an exemplary embodiment, second pivot 102 extends about 15 inches from proximal end 112 of frame 110 and about ¾ inch below top surface 116 of frame 110. Mounting bracket 150 includes an upper flange 154 that is adapted to engage work piece 60 to releasably secure work piece 60 to mounting bracket 150.

Referring to FIG. 3, a mount arm 160 has a lower end 162 pivotally connected to mounting bracket 150 at a third pivot 103 above second pivot 102. In an exemplary embodiment, when first hydraulic cylinder 140 is fully contracted, third pivot 103 extends distally of second pivot 102 and also extends about 15¾ inches from proximal end 112 of frame 110 and about 2 inches above top surface 116 of frame 110. Mount arm 160 also has an upper portion 164.

A pivot bracket 170 is located proximally of mount arm 160. Pivot bracket 170 has a lower end 172 pivotally connected to frame distal end 114 at a fourth pivot 104, a central portion 174 pivotally connected to first cylinder distal end 144 at a fifth pivot 105, and a top end 176 that is connectable to upper portion 164 of mount arm 160 at a sixth pivot 106. In an exemplary embodiment, when first hydraulic cylinder 140 is fully contracted, sixth pivot 106 extends about 13½ inches from proximal end 112 of frame 110 and about 5⅓ inches above top surface 116 of frame 110.

In an exemplary embodiment, fourth pivot 104 extends about 13½ inches from proximal end 112 of frame 110 and about ½ inch above top surface 116 of frame 100. Pivot bracket 170 is attached to frame 110 proximally of the attachment of mounting bracket 150 to frame 110.

Optionally, a second hydraulic cylinder assembly 178 can be used. Second hydraulic cylinder assembly 178 includes a second hydraulic cylinder 180 and a tractor mount 56. Second hydraulic cylinder assembly 178 is located proximally of first hydraulic cylinder 140 and is releasably attachable to tractor 150.

Second hydraulic cylinder 180 has a second proximal end 182 pivotally connected to tractor mount 56 at a seventh pivot 107 and a second distal end 184 pivotally connected to fixed bracket 130 at an eighth pivot 108. Eighth pivot 108 is located proximally of first pivot 101.

Figure 6B:
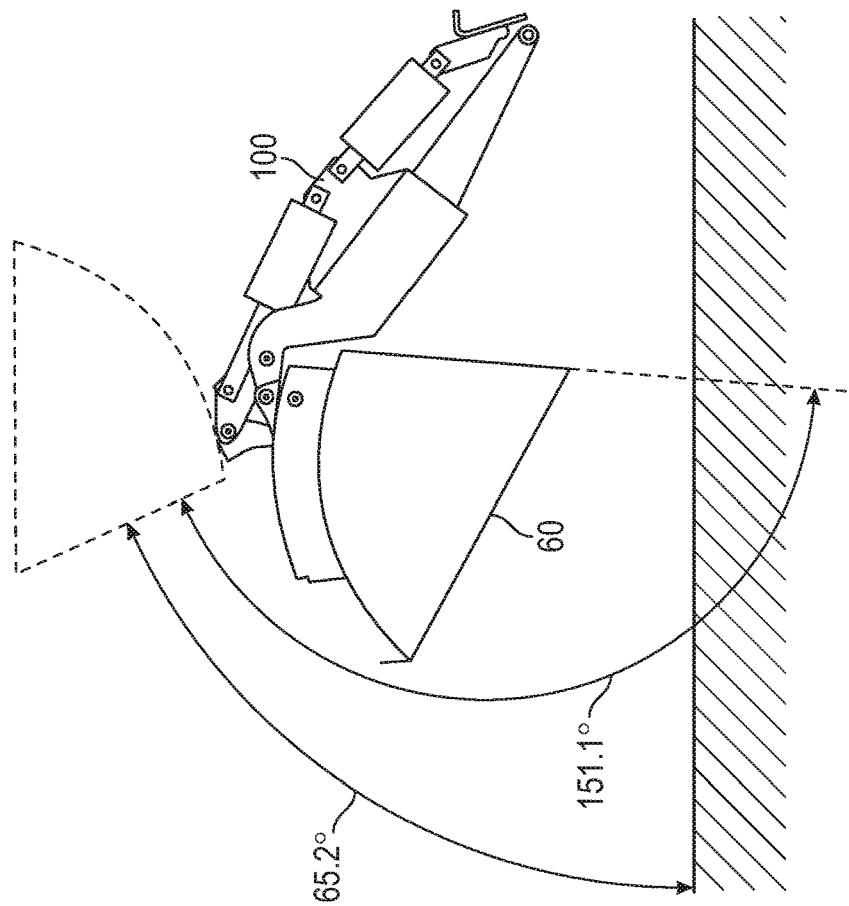
FIG. 6B is a side elevational view of the plow conversion kit shown in FIG. 2, with the work piece attached, showing the range of motion of the work piece.
Figure 6A:
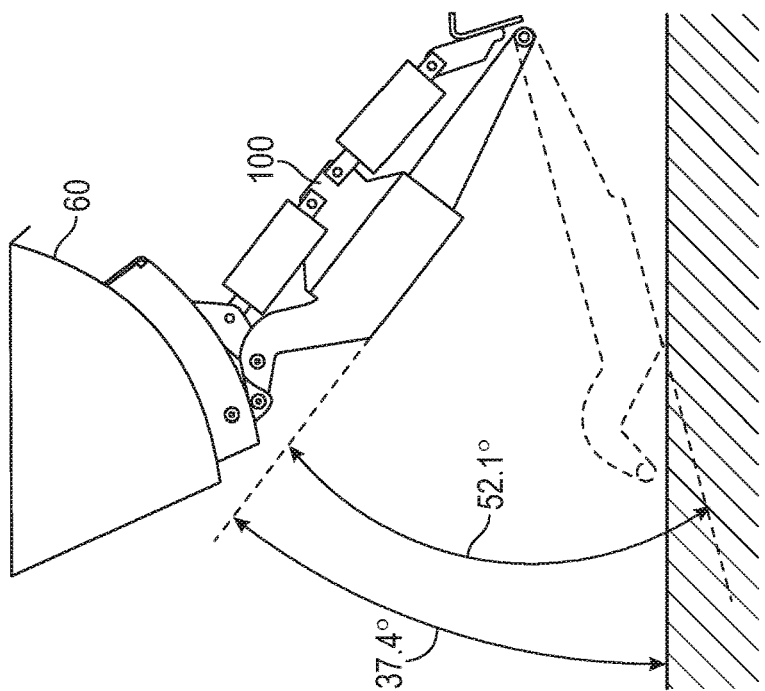
FIG. 6A is a side elevational view of the plow conversion kit shown in FIG. 2, with the work piece attached, showing the range of motion of the kit.

Kit 100 provides a greater range of motion than prior mounting kits. For example, when second hydraulic cylinder 180 is distally extended, frame 110 has a pivot, or "frame lift" angle of greater than 50 degrees, as shown in FIG. 6A. Additionally, when first hydraulic cylinder 140 is extended, at least a portion of mounting bracket 150 and work piece 60 extend into concave cavity 126, resulting in mounting bracket 150 and work piece 60 having a pivot angle of over 150 degrees, as shown in FIG. 6B.

Figure 7:
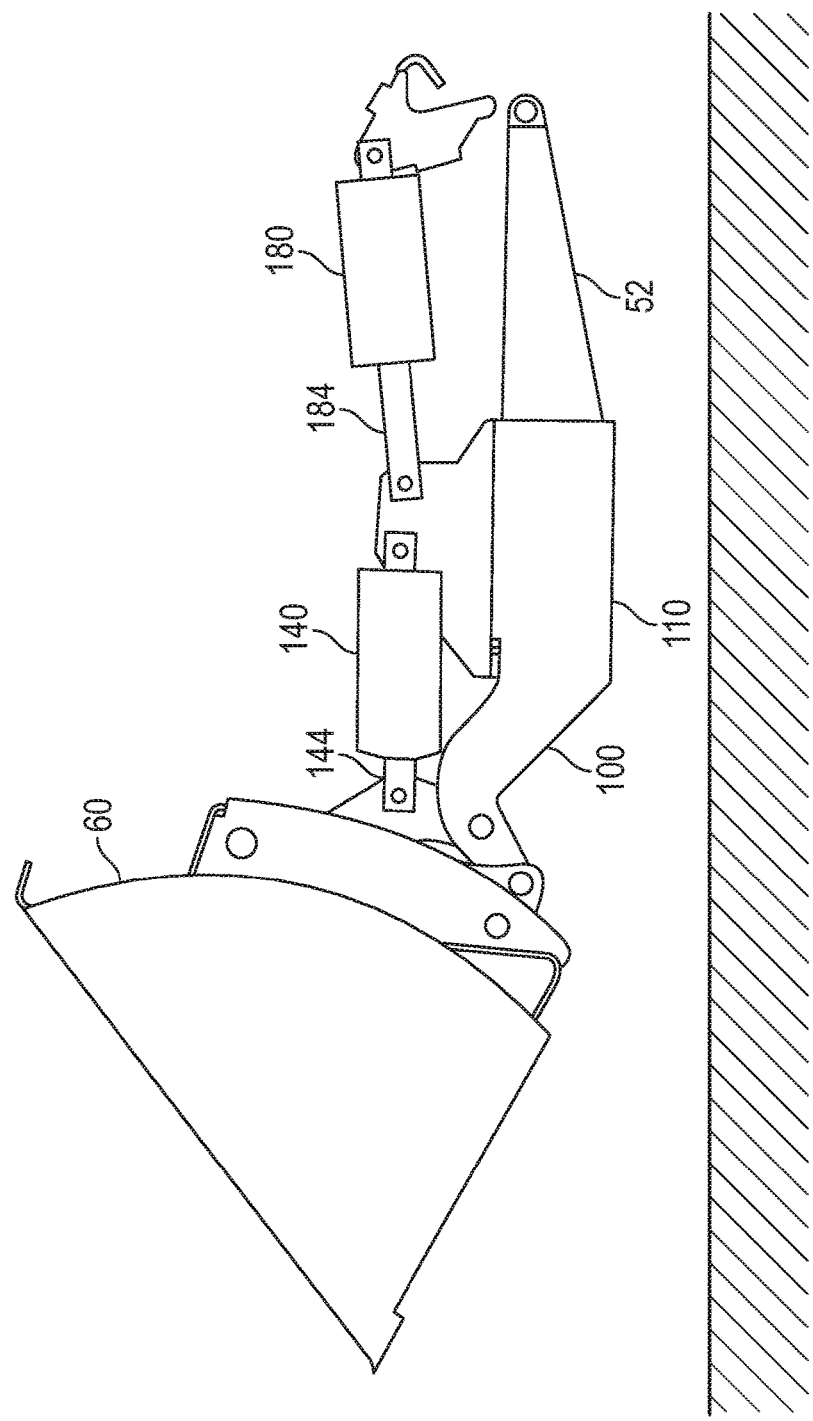
FIG. 7 is a side elevational view of the plow conversion kit shown in FIG. 2, with the work piece attached, showing the frame in a neutral position and the work piece in a back position.
Figure 8:
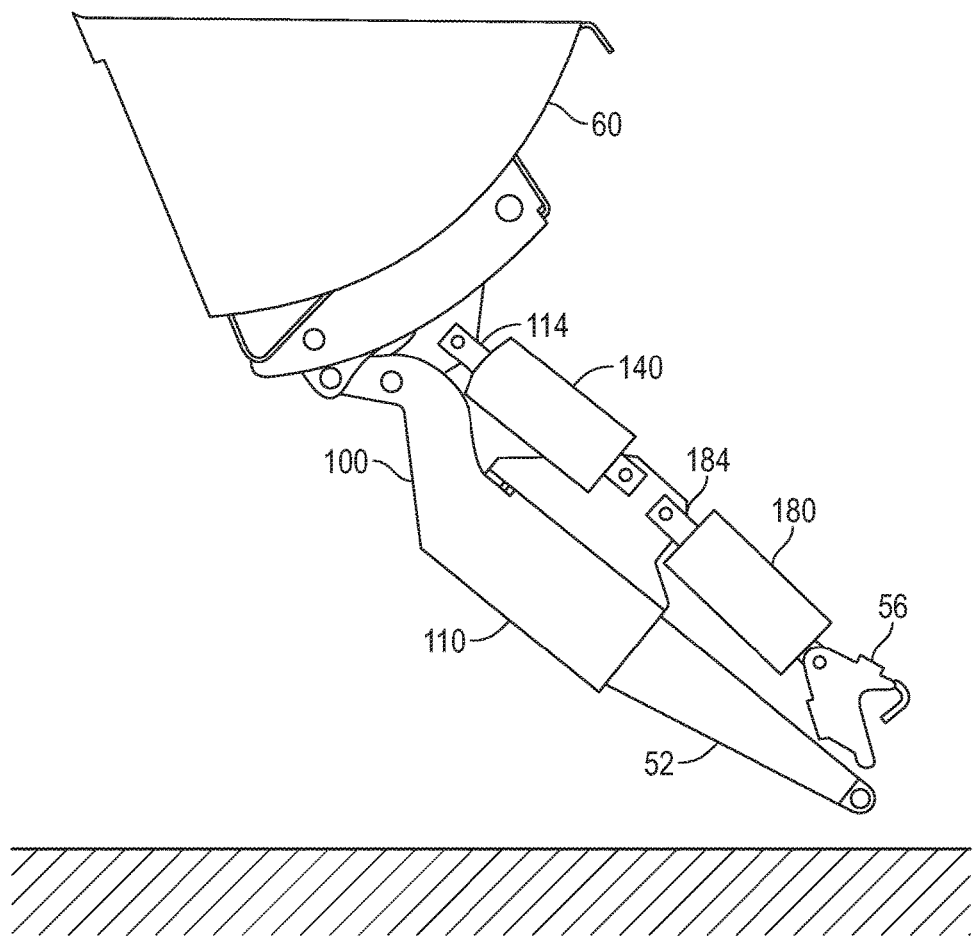
FIG. 8 is a side elevational view of the plow conversion kit shown in FIG. 2, with the work piece attached, showing the frame in a lift position and the work piece in a back position.
Figure 9:
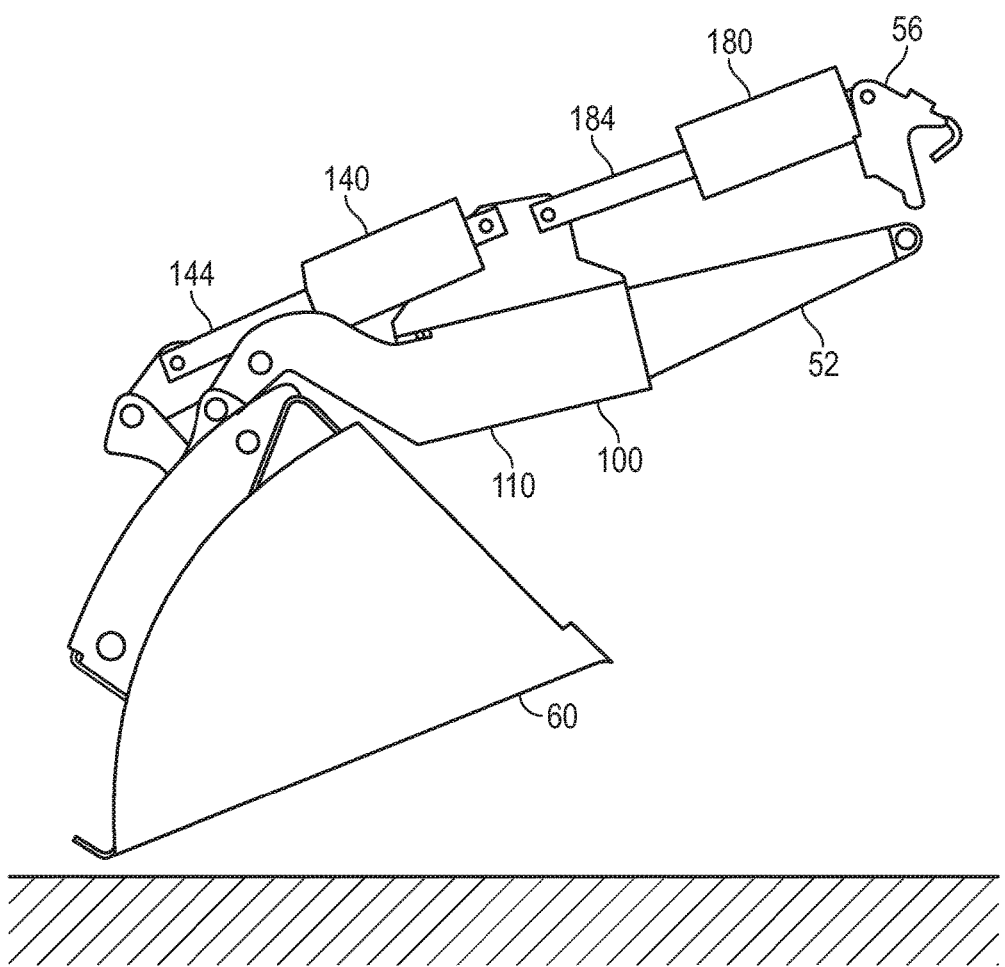
FIG. 9 is a side elevational view of the plow conversion kit shown in FIG. 2, with the work piece attached, showing the frame in a down position and the work piece in a dump position.

FIGS. 7-9 show kit 100 on a tractor 50 in a variety of positions. In FIG. 7, frame 110 is in a neutral position relative to ground G (generally parallel to ground G) with work piece 60 pulled back to retain dirt, debris or other matter within work piece 60. Frame 110 is in the neutral position by extending second distal end 184 of second hydraulic cylinder 180 a little more than half of its length from the body of second hydraulic cylinder 180. Work piece 60 is pulled back by contracting first distal end 144 of first hydraulic cylinder 140 into a retracted position.

In FIG. 8, frame 110 is in an up position relative to ground G with work piece 60 pulled back to retain dirt, debris or other matter within work piece 60. Frame 110 is pivoted upward by contracting second distal end 184 of second hydraulic cylinder 180 into a retracted position. Work piece 60 is pulled back by contracting first distal end 144 of first hydraulic cylinder 140 into a retracted position.

In FIG. 9, frame 110 is in a down position relative to ground G with work piece 60 pushed forward to dump dirt, debris or other matter within work piece 60. Frame 110 is pivoted downward by extending second distal end 184 of second hydraulic cylinder 180 its entire extendable length. Work piece 60 is pushed downward by extending first distal end 144 of first hydraulic cylinder 140 its entire extendable length.

FIG. 10 shows a plow conversion kit 200 according to an alternative embodiment of the present invention. Kit 100 is similar to kit 100, but has eliminated second hydraulic actuator 180, which may be OEM provided. In the configuration shown in FIG. 10, OEM hydraulic cylinder 280 extends generally vertically and has a distal end 282 that is connected to a distal end 58 of plow bracket 52. When distal end 282 is in an extended position, as shown in FIG. 10, kit 200 is tilted downward. When distal end 282 is contracted into cylinder 280, kit 200 is tilted upward.

Other operations of kit 200 are similar to those described above with respect to kit 100.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A plow conversion kit for a tractor comprising:
a frame having a frame proximal end, a frame distal end, and a top surface extending between the proximal end and the distal end, wherein the proximal end is configured to slidingy connect to a tractor bracket;
a unitary fixed bracket directly fixed to the top surface of the frame, the fixed bracket having a fixed bracket proximal end and a fixed bracket distal end;
a first hydraulic cylinder having a first cylinder proximal end pivotally directly connected to the fixed bracket at a first pivot and a first cylinder distal end extending distally of the fixed bracket;
a unitary mounting bracket adapted to releasably attach to a work piece, the mounting bracket having a lower end directly pivotally connected to the frame distal end at a second pivot;
a unitary mount arm having a lower end directly pivotally connected to the mounting bracket at a third pivot above the second pivot; and
a unitary pivot bracket having a lower end directly pivotally connected to the frame distal end at a fourth pivot, a central portion directly pivotally connected to the first cylinder distal end at a fifth pivot, and a top end directly pivotally connected to an upper portion of the mount arm at a sixth pivot.

2. The plow conversion kit according to claim 1, further comprising a second hydraulic cylinder having a second proximal end pivotally connected to a tractor mount at a seventh pivot and a second distal end pivotally connected to the fixed bracket at an eighth pivot.

3. The plow conversion kit according to claim 2, wherein the eighth pivot is located proximally of the first pivot.

4. The plow conversion kit according to claim 3, wherein the eighth pivot is located vertically above the first pivot.

5. The plow conversion kit according to claim 1, wherein the frame has a pivot angle of greater than 50 degrees.

6. The plow conversion kit according to claim 1, wherein the third pivot extends distally of the second pivot.

7. The plow conversion kit according to claim 1, wherein the frame comprises a lower surface extending in a horizontal plane, a central surface extending in an upwardly extending plane from the lower surface, and a distal surface extending in a downwardly extending plane from the central surface.

8. The plow conversion kit according to claim 7, wherein the central surface and the distal surface define a concave cavity.

9. The plow conversion kit according to claim 8, wherein, when the first hydraulic cylinder is distally extended, the mounting bracket extends into the concave cavity.

10. The plow conversion kit according to claim 9, wherein the mounting bracket has a pivot angle of over 150 degrees.

11. The plow conversion kit according to claim 1, wherein the frame proximal end comprises a box channel sized to slide over a plow bracket.

12. A plow conversion kit comprising:
a frame;
a first hydraulic cylinder attached to the frame;
a unitary pivot bracket directly pivotally attached to the frame at a first pivot and to the first hydraulic cylinder at a second pivot;
a unitary mounting bracket directly pivotally attached to the frame,
the mounting bracket adapted to releasably attach to a work piece; and
a unitary mount arm directly pivotally attached to the mounting bracket and to the pivot bracket at a third pivot; wherein the frame comprises a channel adapted to slide over a plow bracket.

13. The plow conversion kit according to claim 12, further comprising a second hydraulic cylinder assembly attached to the frame.

14. The plow conversion kit according to claim 13, wherein the second hydraulic cylinder assembly comprises a second hydraulic cylinder and a tractor mount.

15. The plow conversion kit according to claim 13, wherein the frame and the second hydraulic cylinder assembly are releasably attachable to a tractor.

16. The plow conversion kit according to claim 13, wherein the second hydraulic cylinder assembly is located proximally of the first hydraulic cylinder.

17. The plow conversion kit according to claim 12, wherein the pivot bracket is attached to the frame proximally of the attachment of the mounting bracket to the frame.

18. The plow conversion kit according to claim 12, wherein the mount arm is located distally of the pivot bracket.

19. The plow conversion kit according to claim 12, wherein the frame comprises a distal cavity and wherein, when the first hydraulic cylinder is extended, at least a portion of the mounting bracket is configured to extend into the cavity.

* * * * *